(12) United States Patent
Garcia Rodriguez et al.

(10) Patent No.: US 10,740,637 B2
(45) Date of Patent: Aug. 11, 2020

(54) ANTI-SPOOFING

(71) Applicant: Yoti Holding Limited, London (GB)

(72) Inventors: Francisco Angel Garcia Rodriguez, London (GB); Ahmed Kazim Pal, Eastbourne (GB); John Abbott, Hitchin (GB)

(73) Assignee: Yoti Holding Limited, London (GB)

( * ) Notice: Subject to any disclaimer, the term of this patent is extended or adjusted under 35 U.S.C. 154(b) by 17 days.

(21) Appl. No.: 16/134,845

(22) Filed: Sep. 18, 2018

(65) Prior Publication Data
US 2020/0089979 A1    Mar. 19, 2020

(51) Int. Cl.
*G06K 9/00* (2006.01)
*G06Q 20/40* (2012.01)

(52) U.S. Cl.
CPC ..... *G06K 9/00899* (2013.01); *G06K 9/00288* (2013.01); *G06Q 20/4014* (2013.01); *G06K 2009/00322* (2013.01)

(58) Field of Classification Search
CPC .......... G06K 9/00899; G06K 9/00288; G06Q 20/4014
USPC ....................................................... 382/115
See application file for complete search history.

(56) References Cited

U.S. PATENT DOCUMENTS

| 2010/0177932 A1* | 7/2010 | Yano | G06K 9/6257 |
| | | | 382/103 |
| 2015/0195565 A1* | 7/2015 | Jeong | H04N 19/51 |
| | | | 375/240.12 |
| 2016/0063731 A1* | 3/2016 | Yamamoto | G06T 7/292 |
| | | | 348/159 |
| 2017/0357868 A1* | 12/2017 | Derakhshani | G01S 15/89 |
| 2018/0034852 A1 | 2/2018 | Goldenberg | |

(Continued)

FOREIGN PATENT DOCUMENTS

WO    WO 2017/139325 A1    8/2017

OTHER PUBLICATIONS

Anjos et al., Motion-based Counter-measures to Photo Attacks in Face Recognition, IET Biometrics, vol. 3, Iss. 3, Jul. 22, 2013, pp. 147-158.

(Continued)

*Primary Examiner* — Michael R Neff
(74) *Attorney, Agent, or Firm* — Knobbe, Martens, Olson & Bear, LLP

(57) ABSTRACT

Anti-spoofing technology is provided for verifying a user of a fixed computer terminal. Image data of at least one verification image is received, as captured by an image capture device of the fixed computer terminal at a time corresponding to a request for access to a restricted function of the fixed computer terminal. User verification is applied to determine whether to grant access to the restricted function of the fixed computer terminal. A differential feature descriptor is determined, which encodes feature differences between the verification image data and image data of at least one unobstructed background image as captured by the image capture device. An anti-spoofing classifier processes the differential feature descriptor to classify it in relation to real and spoofing classes. Access to the restricted function of the fixed computer terminal is refused or granted based on the classification of the differential feature descriptor by the anti-spoofing classifier.

20 Claims, 2 Drawing Sheets

(56) References Cited

U.S. PATENT DOCUMENTS

2018/0276489 A1\* 9/2018 Xu .................... G06K 9/00899
2019/0026544 A1\* 1/2019 Hua ........................ G06T 7/194

OTHER PUBLICATIONS

International Search Report and Written Opinion in PCT/EP2019/075059 dated Jan. 8, 2020.
Kim et al., A Motion and Similarity-Based Fake Detection Method for Biometric Face Recognition Systems, IEEE Transactions on Consumer Electronics, vol. 57, No. 2, May 2011, pp. 756-762.
Wang et al., Deep Face Recognition: A Survey, School of Information and Communication Engineering, Beijing University of Posts and Telecommunications, Beijing, China, pp. 1-26.
Yan et al., Face Liveness Detection by Exploring Multiple Scenic Clues, Center for Biometrics and Security Research & National Laboratory of Pattern Recognition Institute of Automation, Chinese Academy of Sciences, Beijing China, Dec. 2012, pp. 188-193.

\* cited by examiner

ANTI-SPOOFING

TECHNICAL FIELD

This disclosure relates to anti-spoofing, i.e. technology for distinguishing between an actual human and a spoofing entity masquerading as such.

BACKGROUND

In the context of device security and the like, a spoofing attack refers to a technique whereby an unauthorised entity attempts to "spoof" a system in order to gain illegitimate access to a restricted function.

A particular class of spoofing occurs in contexts where image-based authentication or other image-based verification processes are used. In such cases, a user may attempt to spoof the system using a pre-captured photograph or image of another user. In this context, anti-spoofing refers to techniques of detecting whether an entity, which may exhibit what are ostensibly human characteristics, is actually a real, living being or is a non-living entity masquerading as such (spoofing entity). This may also be referred to as liveness detection.

Such techniques have, for example, been implemented in modern mobile devices (such as smartphones) to provide anti-spoofing in the context of biometric authentication.

SUMMARY

The inventors of the present invention have recognized that different considerations apply in the context of fixed computer terminals, such as self-checkout terminals, EPOS terminals etc. The fixed nature of such terminals is exploited in order to provide robust image-based anti-spoofing.

One aspect of the present invention provides an anti-spoofing method for verifying a user of a fixed computer terminal, the anti-spoofing method comprising implementing, in a user verification processing system, the following steps. Image data of at least one verification image is received, as captured by an image capture device of the fixed computer terminal at a time corresponding to a request for access to a restricted function of the fixed computer terminal. In response to the access request, user verification is applied to determine whether to grant access to the restricted function of the fixed computer terminal as follows. A differential feature extractor determines a differential feature descriptor encoding feature differences between the verification image data and image data of at least one unobstructed background image as captured by the image capture device. An anti-spoofing classifier processes the differential feature descriptor to classify it in relation to real and spoofing classes corresponding, respectively, to verification images of actual humans and verification images of spoofing entities. Access to the restricted function of the fixed computer terminal is refused or granted based on the classification of the differential feature descriptor by the anti-spoofing classifier.

Because the terminal is fixed, the unobstructed background image can be used as a reference when anti-spoofing is applied to the verification image in order to isolate features of an entity to be verified (as captured in the verification image) from background features (as captured in the background image)—exploiting the fact that the background features can be assumed to remain essentially static between the times at which the different images are captured. This has been found to provide a significantly more reliable basis for anti-spoofing classification, which can for example be performed using a suitably-trained machine learning model.

In embodiments, the user verification may further comprise: using at least one age-verification process to determine a user age value for a user of the fixed computer terminal at a time corresponding to the access request, wherein the requested access is granted or refused based on the determined user age.

The user age value may be an estimated user age value and the age-verification process may comprise an age-estimation process applied to sensor data captured from the user at the fixed computer terminal, in order to determine the estimated user age value.

The sensor data may comprise image data of the at least one verification image.

The restricted function may be a payment function.

Access to the payment function may be granted only when the user age is determined to meet a predetermined age requirement.

The differential feature descriptor may be determined by determining individual feature descriptors for the verification and unobstructed background image data, and comparing the individual feature descriptors.

Each of the individual feature descriptors may be a histogram of gradients.

The anti-spoofing classifier may be a machine learning classifier which has been trained on example verification images corresponding to one or both of the real and spoofing classes.

The anti-spoofing classifier may be a support vector machine (SVM).

The unobstructed background image data may have been determined at a time when the fixed computer terminal was determined not to be in use.

Background features in a field of view of the image capture device may be determined to be unobstructed for capturing the at least one unobstructed background image by processing sensor data captured at the fixed computer terminal (such as image data captured by the image capture device).

The at least one unobstructed background image may be captured at a time when background features in a field of view of the image capture device are assumed to be unobstructed.

Another aspect of the invention provides a computer program comprising computer-readable instructions stored on non-transitory computer-readable storage media, which are configured, when executed on one or more processors of a user verification processing system, to carry out the above steps.

Another aspect of the invention provides a user verification processing system comprising: an image input configured to receive image data captured by an image capture device of a fixed computer terminal; and one or more processors configured to apply the above steps to image data received at the image input.

Another aspect of the invention provides a fixed computer terminal comprising: an image capture device; and the above user verification system, which is coupled to the image capture device for receiving captured image data therefrom and configured to apply the said steps thereto.

BRIEF DESCRIPTION OF FIGURES

For a better understanding of the present invention, and to show how embodiments of the same may be carried into effect, reference is made to the following figures in which.

DETAILED DESCRIPTION

Embodiments of the present invention will now be described by way of example only.

Figure 1:
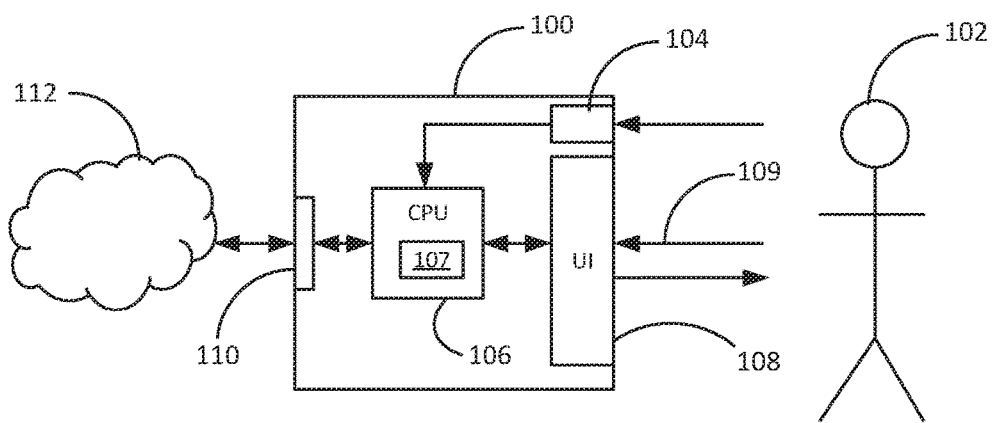
FIG. 1 shows a schematic block diagram of a fixed computer terminal.

FIG. 1 shows a highly schematic block diagram of a fixed computer terminal 100 at which a user 102 may be verified. The terminal 100 is shown to comprise an image capture device 104 (camera) which can be used to capture images of an area within the camera's field of view. The computer terminal 100 is fixed that the image capture device 104 can be used to capture images of the same area over an extended time period.

Such image data is used as a basis for verifying the user 102. A component of the user verification is anti-spoofing, which requires the user 102 to allow an image of himself to be captured by the image capture device 104 (verification image: 20, FIG. 1). An anti-spoofing check is performed to verify that is indeed an actual human in the verification image, as opposed to a photograph, video (played back on a mobile device, for example) or model of a human, or other spoofing entity that may have human characteristics.

Because the terminal 100 is fixed, the image capture device 104 can be used to pre-capture an unobstructed background image (22, FIG. 1), i.e. of the area within the camera's field of view when no user or other obstruction is present, and which therefore contains only background features. This in turn can then be used as a reference in applying anti-spoofing to a subsequent verification image. In particular, it allows features of an entity being verified (which may be an actual human or a spoofing entity) to be isolated from the background features, which in turn provides more reliable anti-spoofing. This exploits the fixed nature of the terminal, which means the background features remain sufficiently static between the capturing of the two images.

This has various uses. For example, in a biometric authentication context, a biometric of the user 102 may be captured and authenticated in order to regulate access at the computer terminal 100. Anti-spoofing can be performed in this context to verify that the biometric has been captured from an actual human, to present a so-called "presentation attack" in which an unauthorized user attempts to spoof the system using a photograph, video, model etc. of an authorized user.

In the present examples, the anti-spoofing technology is applied in conjunction with age verification. Automated age verification processing is used to determine an estimated user age from a set of features extracted from one or more images captured by the image capture device 104. Anti-spoofing is applied in conjunction with this to verify that those features have been captured directly from an actual human in the vicinity of the terminal 100, rather than a spoofing entity. This can be usefully applied in the context of age-restricted purchases, in order to prevent (say) underage users from circumventing age restrictions using photographs etc. of older humans. In such contexts, the fixed computer terminal 100 may for example be an electronic point-of-sale (EPOS) terminal, a self-checkout terminal of the kind used in various retail outlets, a vending machine or any other fixed terminal offering one or more age-restricted functions. This allows age restriction to be enforced without any manual oversight or with reduced manual oversight.

Reference is made to United Kingdom Patent Application 1810639.3, entitled "Age Verification" and filed Jun. 28, 2018, the entire contents of which are incorporated herein by reference. Disclosed therein is a method of authorizing the performance of an age-restricted activity at a computer terminal, which in the present context is the fixed computer terminal 100 of FIG. 1. Image data of at least one image captured at the terminal 100 is processed as follows, in order to determine whether performance of the age-restricted activity is authorized. A structure having human characteristics is detected in the at least one image and an estimated human age is determined based on the human characteristics (age-estimation). Anti-spoofing (liveness detection) is applied in conjunction with the age-estimation, in order to determine whether the structure in the image exhibits at least one liveness characteristic indicating the human characteristics from which the estimated human age is determined have been captured directly from a living human at the computer terminal. In the present content, the anti-spoofing element is provided by anti-spoofing classification of differential feature descriptors, as described later.

The terminal 100 is further shown to comprise at least one processor 106 such as a CPU (central processing unit) which is configured to execute at least one restricted function 107. This can be any function to which access is restricted subject, at least in part, to anti-spoofing checks. Examples include, for example, functions that provide access to secure data or any other secure functionality to which access is regulated. In the present example, the restricted function 107 is an electronic payment function which can receive electronic payment from the user 102. Access is restricted in certain circumstances (e.g. when the user 102 is attempting to purchase age-restricted item(s)), whereby the user 102 is only granted access to the restricted function 107 when it is determined, with sufficient confidence, that (i) the estimated human age meets a predetermined age requirement and (ii) the structure from which the estimated age is determined corresponds to an actual human rather than a spoofing entity.

Once access is granted, the electronic payment function 107 could for example allow a user to make an electronic payment (using a payment card, mobile device etc.) and/or a physical cash payment using a cash-receiving mechanism of the terminal 100 (not shown).

The terminal 100 also comprises a user interface (UI) 108 via which user inputs may be received and information may be outputted, to/from the user 102 and/or another user such as a terminal supervisor.

In particular, a request 109 may be instigated via the UI 108 for access to the restricted function 107, which is accepted or rejected in accordance with the processes described below.

The terminal 100 is also shown to comprise a network interface 110 via which the terminal 100 can connect to a network 112, such as the Internet and/or a payment provided network (which may or may not be accessed via an intermediary network such as the Internet).

The image capture device 104, UI 108 and network interface 110 are coupled to the at least one processor 106 and operate under the control of one or more computer programs executed on the at least one processor 106.

Figure 2:
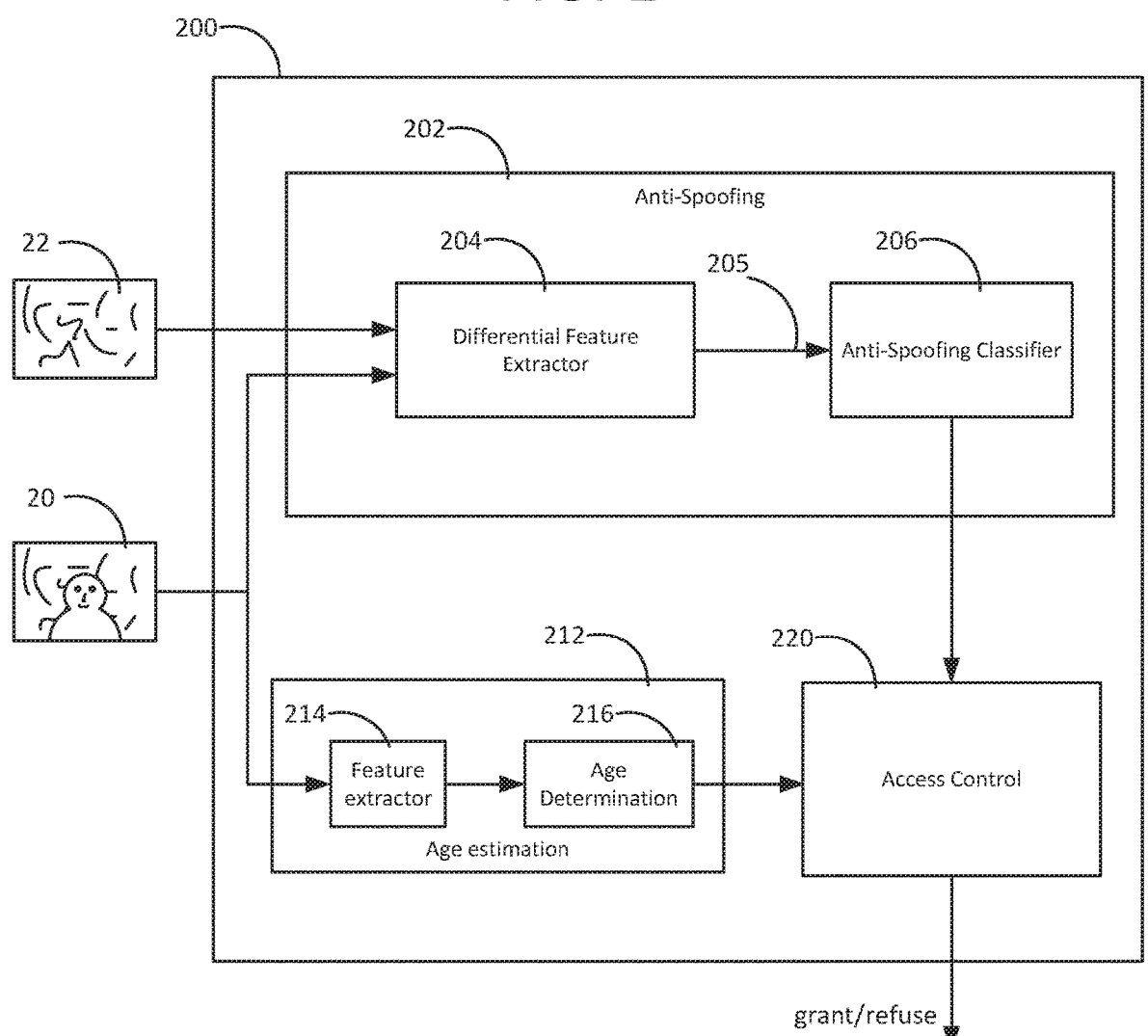
FIG. 2 shows a functional block diagram of a user verification processing system.

FIG. 2 shows a schematic functional block diagram for a user verification system 200, shown to comprise an anti-spoofing component 202, an age estimation component 212, and an access controller 220. The anti-spoofing component 202, age estimation component 212 and access controller 220 are functional components of the user verification system 200, representing different aspects of its functionality. This functionality is carried out by one or more processors of the user verification system 200 in response to executable program instructions. The user verification system 200 can be embodied in the terminal 100 itself (in which case the functionality is implemented by the at least one processor 106 thereof), or in a remote (back-end) computer system (e.g. to which image data as captured by the image capture device 104 may be transmitted for processing), or a combination thereof (i.e. in part locally and in part remotely).

Anti-Spoofing

The anti-spoofing component 202 is shown to comprise a differential feature extractor 204 and an anti-spoofing classifier 206 having an input connected to an output of the differential feature extractor 204.

The differential feature extractor 204 receive image data of at least one verification image 20 and image data of at least one unobstructed background image 22.

The unobstructed background image 22 is captured at a time when the background features in the camera's field of are determined or assumed to be unobstructed, for example, at a time when the terminal 100 is determined not to be in use. This could be explicitly detected based on image data captured from the camera 104 and/or other sensor data captured at the terminal 100, or the background image may simply be captured at a time when it can be assumed the background features are unobstructed.

The verification image 20 is captured at a time corresponding to the request 109 for access to the restricted function 107, when the user 102 who wishes to access the restricted function 107 (or have it accessed on his behalf) is assumed to be within the camera's field of view. For example, in response to the request, the user 102 may be instructed, via the UI 108, to make his face visible within the field of view before capturing the verification image 20, and be given an appropriate opportunity to do so before the verification image is captured. At this point, a nefarious user attempting to spoof the system might instead present a spoofing entity to the camera 104.

The term "image data of a captured image" can refer to all or part of an image or images itself/themselves (raw image data), or data derived from an image(s) such as a feature vector, feature map or other feature descriptor etc.).

Feature Extraction

The differential feature extractor 204 processes the image data of the captured images 20, 22 in order to compute what is referred to herein as a differential feature descriptor 205. A differential feature descriptor means a set of features that is determined by comparing the validation image 20 with the background image 22, in order to extract from the validation 20 image a set of features corresponding to the entity to be verified, whilst suppressing background features using the background image 22 as a reference.

Figure 3:
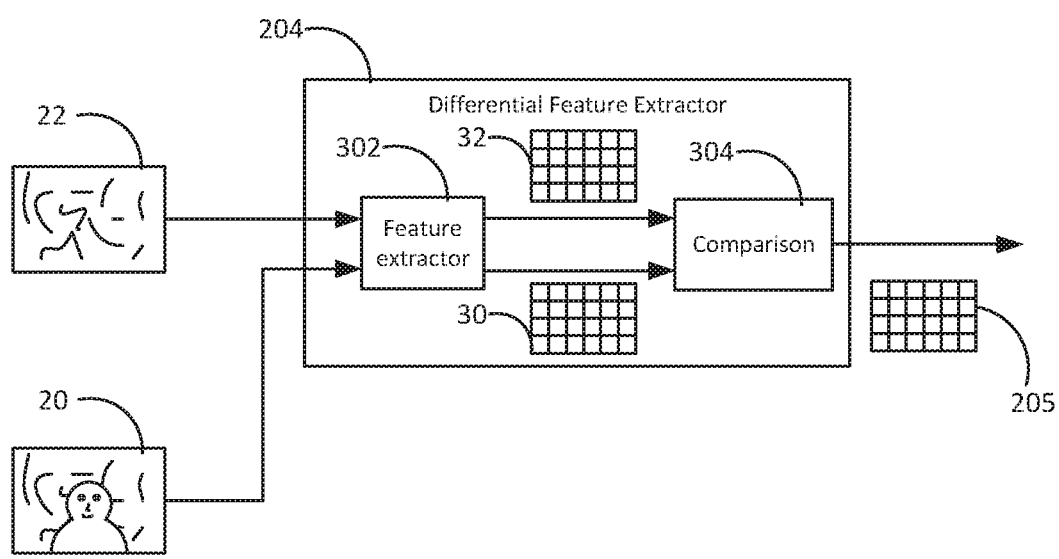
FIG. 3 shows details of a differential feature extractor in one example.

FIG. 3 shows further details of the differential feature extractor 204 in one example. In FIG. 3, the differential feature extractor 204 is shown to comprise an individual feature extractor 302 for extracting individual feature descriptors 30, 32 from the verification and background images 20, 22 respectively and a comparison component 304 for comparing the individual feature descriptors in order to determine the differential feature descriptor 205.

The individual feature descriptors 30, 32 as extracted from the verification image 20 and the background image 22 may be referred to as the verification feature descriptor and background feature descriptor respectively. As will be appreciated, these feature descriptors 30, 32 can be derived in various ways and can take various forms.

For example, the individual feature descriptor 30, 32 for each image 20, 22 may be a histogram of oriented gradients (HOG), in which intensity gradients form the basis of the feature extraction. The image is divided into typically small cells, e.g. of 8×8 pixels, a histogram of intensity gradient directions is computed for each cell, and the histograms are concatenated to compute the HOG for the image. This is a form of edge detection, and other edge detection methods may be applied to achieve acceptable results.

As another example, (fine-grained) segmentation may be applied to the images 20, 22, to detect the boundaries of distinct structural elements within them. Existing convolution neural network (CNN) and other segmentation models can be used for this purpose. In this case, the feature descriptors 30, 32 may be in the form of segmentation feature maps.

The comparison component 304 compares the individual feature descriptors 30, 32 with each other, in order to suppress any background features in the verification feature descriptor 30, using the background feature descriptor 32 as a reference. This may be a subtraction operation applied to the feature descriptors 30, 32 to determine a difference between them, however the nature of this comparison may depend on the form of the feature descriptors 30, 32. In any event, the result of the comparison is the differential feature descriptor 205 that can then be used as a basis for anti-spoofing.

Anti-Spoofing Classification

Returning to FIG. 2, the differential feature descriptor 205 is provided to the anti-spoofing classifier 206, which processes the differential feature descriptor 205 in order to classify it in relation to a set of classes comprising at least a "real" class and a "spoofing" class. The real class corresponds to verification images of actual humans whilst the spoofing class corresponds to verification images of spoofing entities.

The anti-spoofing classifier 206 is a machine learning (ML) classifier which has been pre-trained on examples of the kind of inputs it needs to be able classify. This could for example be a support vector machine (SVM), one or more neural network layers etc.

Generally, the training examples will include examples from each of the classes, although certain classifiers (such as one-class SVMs) can be trained to perform e.g. binary classification using examples from a single class. In the present example, the training examples are derived from training validation images capturing a combination of actual humans and spoofing entities, with training labels indicating the type of entity (real or spoofing) captured therein. Features are extracted from the training images as above, in order to provide differential feature descriptors, labelled as real or spoofing, for training the anti-spoofing classifier 206.

Age-Verification

The age estimation component 212 is shown to comprise a feature extraction component 214 and an age determination component 216 having an input coupled to an output of the feature extraction component 214. The feature extraction component 214 is shown to receive image data of the validation image 20, and extract therefrom a set of features which may be used as a basis for age estimation. Although a separate feature extractor is shown in FIG. 2, the differential feature description 205 itself could be used as a basis for age-estimation, and in that event may or may not be subject to further processing to refine the features for this purpose. In other cases, it may be appropriate to use a separate feature representation (which may or may not be derived with reference to a background image), such as a set of detected facial/skeletal points. The feature descriptor use for age estimation could be derived from the same verification image(s) 20, or from separately captured image(s) and/or other sensor data suitable for this purpose which is captured at the computer terminal 100.

Whatever its precise form, the feature descriptor is used by the age determination component 216 in order to determine an estimated age value for the entity captured in the verification image 22. This denotes an estimated age or age range of the entity to a particular level of accuracy. In the simplest case, age-estimation could be a binary classification in relation to an underage class and a non-underage class, defined with respect to a particular age threshold (e.g. 18 or 21 years). In any event, the output of the age determination component 216 is at least one age estimated user age value indicating whether or not the entity meets the relevant age requirement.

Age estimation based on images is known per se and can be implemented accurately using modern ML models. Therefore further details of the age estimation are not described herein.

In another example, age verification may be performed based on a digital identity of the user. Reference is made to International patent application Publication No. WO/2016/128569, entitled "Digital Identity System" and filed Feb. 12, 2016; United States Patent Application Publication No. 2016/0239653, entitled "Digital Identity" and filed Feb. 13, 2015; United States Patent Application Publication No. 2016/0239657, entitled "Digital Identity System" and filed Feb. 13, 2015; United States Patent Application Publication No. 2016/0241531, entitled "Confidence Values" and filed Feb. 13, 2015; United States Patent Application Publication No. 2016/0239658, entitled "Digital Identity" and filed Feb. 13, 2015; and United States Patent Application Publication No. 2016/0241532, entitled "Authentication of Web Content" and filed Feb. 13, 2015. Each of the foregoing is incorporated herein by reference in its entirety. The further age verification process can be carried out by sharing an age-related identity attribute (e.g. date of birth or 18+ attribute etc.) with the self-checkout terminal as described therein. In this context, a trusted digital identity system provides the attribute, which is also anchored to a passport or other authenticated identity document. The digital identity system and the ID document are both trusted sources of identity information, allowing the identity attribute to be verified by verifying its source. The identity storing process is summarised below in the present context. Facial recognition is used to match a selfie taken by the user with an identity photo on the passport or other ID document, before releasing the age-related attribute.

Access Control

The access controller 220 receives the at least user age value from the age determination component 216 and the results of the anti-spoofing classification from the anti-spoofing classifier 206, and uses these to determine whether or not to grant access to the restricted function 107. In order to grant access, the access controller 220 must be sufficiently confident that the relevant age requirement is met and also that the entity whose age has been determined or estimated is an actual human, i.e. belonging to the real class (e.g. with sufficiently high probability in the case of a probabilistic classification).

It will be appreciated that, whilst specific embodiments of the invention have been described, these are not exhaustive. The scope of the invention is not defined by the described embodiments but only by the appendant claims.

The invention claimed is:

1. An anti-spoofing method for verifying a user of a fixed computer terminal, the anti-spoofing method comprising implementing, in a user verification processing system, the following:
receiving image data of at least one verification image as captured by an image capture device of the fixed computer terminal at a time corresponding to a request for access to a restricted function of the fixed computer terminal; and
in response to the access request, applying user verification to determine whether to grant access to the restricted function of the fixed computer terminal, by:
determining, by a differential feature extractor, a differential feature descriptor encoding feature differences between the verification image data and image data of at least one unobstructed background image as captured by the image capture device, wherein the differential feature descriptor isolates features of the user to be verified, as captured in only the verification image, from background features captured in both the verification image and the unobstructed background image, and wherein the differential feature descriptor excludes the background features captured in both the verification image and the unobstructed background image,
processing, by an anti-spoofing classifier, the differential feature descriptor to classify it in relation to real and spoofing classes corresponding, respectively, to verification images of actual humans and verification images of spoofing entities, and
granting or refusing access to the restricted function of the fixed computer terminal based on the classification of the differential feature descriptor by the anti-spoofing classifier.

2. The anti-spoofing method according to claim 1, wherein the user verification further comprises:
using at least one age-verification process to determine a user age value for a user of the fixed computer terminal at a time corresponding to the access request, wherein the requested access is granted or refused based on the determined user age.

3. The anti-spoofing method according to claim 2, wherein the user age value is an estimated user age value and the age-verification process comprises an age-estimation process applied to sensor data captured from the user at the fixed computer terminal, in order to determine the estimated user age value.

4. The anti-spoofing method according to claim 3, wherein the sensor data comprises image data of the at least one verification image.

5. The anti-spoofing method according to claim 2, wherein the restricted function is a payment function, and wherein access to the payment function is granted only when the user age is determined to meet a predetermined age requirement.

6. The anti-spoofing method according to claim 1, wherein the restricted function is a payment function.

7. The anti-spoofing method according to claim 1, wherein the differential feature descriptor is determined by determining individual feature descriptors for the verification and unobstructed background image data, and comparing the individual feature descriptors.

8. The anti-spoofing method according to claim 7, wherein each of the individual feature descriptors is a histogram of gradients.

9. The anti-spoofing method according to claim 8, wherein the anti-spoofing classifier is a machine learning classifier which has been trained on example verification images corresponding to one or both of the real and spoofing classes.

10. The anti-spoofing method according to claim 9, wherein the anti-spoofing classifier is a support vector machine (SVM).

11. The anti-spoofing method according to claim 1, wherein the unobstructed background image data was determined at a time when the fixed computer terminal was determined not to be in use.

12. The anti-spoofing method according to claim 1, wherein background features in a field of view of the image capture device are determined to be unobstructed for capturing the at least one unobstructed background image by processing sensor data captured at the fixed computer terminal.

13. The anti-spoofing method according to claim 1, wherein the at least one unobstructed background image is captured at a time when background features in a field of view of the image capture device are assumed to be unobstructed.

14. Non-transitory computer-readable storage media including computer-readable instructions, which when executed on one or more processors of a user verification processing system, cause the system to carry out the following:
receiving image data of at least one verification image as captured by an image capture device of a fixed computer terminal at a time corresponding to a request for access to a restricted function of the fixed computer terminal; and
in response to the access request, applying user verification to determine whether to grant access to the restricted function of the fixed computer terminal, by:
determining, by a differential feature extractor, a differential feature descriptor encoding feature differences between the verification image data and image data of at least one unobstructed background image as captured by the image capture device, wherein the differential feature descriptor isolates features of the user to be verified, as captured in only the verification image, from background features captured in both the verification image and the unobstructed background image, and wherein the differential feature descriptor excludes the background features captured in both the verification image and the unobstructed background image,
processing, by an anti-spoofing classifier, the differential feature descriptor to classify it in relation to real and spoofing classes corresponding, respectively, to verification images of actual humans and verification images of spoofing entities, and
granting or refusing access to the restricted function of the fixed computer terminal based on the classification of the differential feature descriptor by the anti-spoofing classifier.

15. A user verification processing system comprising:
an image input configured to receive image data captured by an image capture device of a fixed computer terminal; and
one or more processors configured to verify a user of the fixed computer terminal by at least:
receiving image data of at least one verification image as captured by an image capture device of the fixed computer terminal at a time corresponding to a request for access to a restricted function of the fixed computer terminal; and
in response to the access request, applying user verification to determine whether to grant access to the restricted function of the fixed computer terminal, by:
determining, by a differential feature extractor, a differential feature descriptor encoding feature differences between the verification image data and image data of at least one unobstructed background image as captured by the image capture device, wherein the differential feature descriptor isolates features of the user to be verified, as captured in only the verification image, from background features captured in both the verification image and the unobstructed background image, and wherein the differential feature descriptor excludes the background features captured in both the verification image and the unobstructed background image,
processing, by an anti-spoofing classifier, the differential feature descriptor to classify it in relation to real and spoofing classes corresponding, respectively, to verification images of actual humans and verification images of spoofing entities, and
granting or refusing access to the restricted function of the fixed computer terminal based on the classification of the differential feature descriptor by the anti-spoofing classifier.

16. The user verification processing system according to claim 15, wherein the system is embodied in the fixed computer terminal and coupled to an image capture device of the fixed computer terminal for receiving captured image data therefrom and verifying the user of the fixed computer terminal based at least partly on the captured image data.

17. The user verification processing system according to claim 15, wherein the user verification further comprises:
using at least one age-verification process to determine a user age value for a user of the fixed computer terminal at a time corresponding to the access request, wherein the requested access is granted or refused based on the determined user age.

18. The user verification processing system according to claim 17, wherein the user age value is an estimated user age value and the age-verification process comprises an age-estimation process applied to sensor data captured from the user at the fixed computer terminal, in order to determine the estimated user age value.

19. The user verification processing system according to claim 18, wherein the sensor data comprises image data of the at least one verification image.

20. The user verification processing system according to claim 15, wherein the restricted function is a payment function.

* * * * *